(12) United States Patent
Hoogzaad

(10) Patent No.: US 8,339,075 B2
(45) Date of Patent: Dec. 25, 2012

(54) METHOD FOR CONTROLLING A DECELERATION PROCESS OF A DC MOTOR AND CONTROLLER

(75) Inventor: Gian Hoogzaad, Mook (NL)

(73) Assignee: NXP B.V., Eindhoven (NL)

( * ) Notice: Subject to any disclaimer, the term of this patent is extended or adjusted under 35 U.S.C. 154(b) by 598 days.

(21) Appl. No.: 12/307,152

(22) PCT Filed: Jul. 3, 2007

(86) PCT No.: PCT/IB2007/052572
§ 371 (c)(1),
(2), (4) Date: Dec. 31, 2008

(87) PCT Pub. No.: WO2008/004177
PCT Pub. Date: Jan. 10, 2008

(65) Prior Publication Data
US 2009/0284193 A1    Nov. 19, 2009

(30) Foreign Application Priority Data
Jul. 4, 2006    (EP) .................................... 06116572

(51) Int. Cl.
*H02P 3/14* (2006.01)
(52) U.S. Cl. ............... 318/376; 318/400.09; 318/400.35
(58) Field of Classification Search ............. 318/376, 318/400.09, 400.35, 400.01, 400.06, 400.28, 318/400.34, 400.27, 811; 388/819; 363/132
See application file for complete search history.

(56) References Cited

U.S. PATENT DOCUMENTS

| | | | |
|---|---|---|---|
| 6,222,334 B1 | 4/2001 | Tamagawa et al. | |
| 6,232,729 B1 | 5/2001 | Inoue | |
| 6,445,879 B1 | 9/2002 | Youn et al. | |
| 6,804,127 B2 | 10/2004 | Zhou | |
| 6,949,906 B2 | 9/2005 | Boscolo et al. | |
| 6,956,751 B2 | 10/2005 | Youm | |
| 7,068,010 B2 | 6/2006 | Youm | |
| 7,113,380 B2 | 9/2006 | Youm | |
| 2004/0245953 A1* | 12/2004 | Peterson | 318/439 |
| 2006/0090731 A1* | 5/2006 | Hoshino et al. | 123/399 |
| 2009/0230905 A1* | 9/2009 | Proctor et al. | 318/400.09 |

FOREIGN PATENT DOCUMENTS

| | | |
|---|---|---|
| EP | 1258980 A1 | 11/2002 |
| JP | 2005198441 A | 7/2005 |
| JP | 2005198442 A | 7/2005 |

* cited by examiner

*Primary Examiner* — Karen Masih

(57) ABSTRACT

Consistent with an example embodiment there is a method for controlling a deceleration process of a DC motor, wherein the DC motor is driven by a bridge driver coupled to a power supply intended to provide a supply voltage VDD at a power supply output. The method comprises applying a deceleration PWM signal to the bridge driver for decelerating the DC motor, and controlling the bridge driver such that a motor-induced back current is reduced, if the voltage at the power supply output exceeds a first voltage threshold which is higher than VDD. In accordance with the example embodiment, the method includes the following: if the voltage at the power supply output falls below a second voltage threshold which is lower than the first voltage threshold, control of the bridge driver is terminated such that the motor-induced back current is reduced.

21 Claims, 4 Drawing Sheets

METHOD FOR CONTROLLING A DECELERATION PROCESS OF A DC MOTOR AND CONTROLLER

FIELD OF THE INVENTION

The present invention relates to a method for controlling a deceleration process of a DC motor, wherein the DC motor is driven by a bridge driver coupled to a power supply intended to provide a supply voltage VDD at a power supply output, the method comprising the following steps: applying a deceleration PWM signal to the bridge driver for decelerating the DC motor, and controlling the bridge driver such that a motor-induced back current is reduced, if the voltage at the power supply output exceeds a first voltage threshold which is higher than VDD.

Furthermore, the invention is directed to a controller for controlling a deceleration process of a DC motor which is driven by a bridge driver coupled to a power supply intended to provide a supply voltage VDD at a power supply output, the controller comprising: means for applying a deceleration PWM signal to the bridge driver for decelerating the DC motor, and means for controlling the bridge driver such that the motor-induced back current is reduced, if the voltage at the power supply output exceeds a first voltage threshold which is higher than VDD.

BACKGROUND OF THE INVENTION

For example, DC brushless spindle motors are used in several applications, amongst others in optical and magnetic disc drives to rotate the storage medium. Other application fields are, for example, VCRs, shavers, fans, blowers and robotics. Braking these motors can be done electronically by driving the motor in such a way that the motor current reverses polarity relative to forward rotation. Since during deceleration the motor also acts as a generator, braking regimes are possible where a net current is delivered back to the power supply. Mechanical energy present in the inertia of the rotor is recuperated to electrical energy for the supply battery or capacitor. Using this regenerative braking regime yields a green and power-efficient motor drive system.

One known problem of regenerative braking is the possibility of over-voltages on the power supply when the power supply cannot deal with negative currents. Usually this is the case since asymmetric linear or switched-mode controllers are used to regulate the power supply voltage. Consequently, the power supply decoupling capacitor which is usually provided has to deal with these negative motor-induced back currents and given the large amount of energy in the motor dangerous over-voltages can occur. A known method to overcome these over-voltages is to use a Zener diode protection or an on-chip active clamp. This involves extra hardware cost since these devices need to be able to deal with considerable power dissipation (e.g. 4 W for optical disc drives). To overcome these problems it is for example known from U.S. Pat. No. 6,949,906 B2, which discloses a method and a controller of the type mentioned at the beginning, to either short circuit or set into a high impedance mode the windings of a DC motor for a predetermined time interval, if a dangerous condition is detected during the deceleration process of the DC motor, for example an over-voltage at the power supply output. If the windings are short circuited, energy is dissipated because of friction and because the back-EMF of the motor results in current through the winding resistance. If the windings of the motor are set into a high impedance mode by opening the winding connections, energy is dissipated by friction only. However, short circuiting or setting into a high impedance mode the windings of the motor for a predetermined time interval may lead to a waste of energy, if the predetermined time interval is longer than the duration of the dangerous condition. This may often be the case because the predetermined time interval has to be selected long enough to ensure that the dangerous condition is no longer present and will not occur again, particularly not in an even worse form, if the normal deceleration process is resumed.

It is the object of the invention to further develop the methods and controllers of the type mentioned at the beginning such that the waste of energy discussed above is avoided.

SUMMARY OF THE INVENTION

In accordance with a first aspect of the invention this object is solved by a method of the type mentioned at the beginning which comprises the following additional step: If the voltage at the power supply output falls below a second voltage threshold which is lower than the first voltage threshold, terminating controlling the bridge driver such that the motor-induced back current is reduced. With this solution not only the occurrence of a dangerous situation is monitored, but also the end thereof. Therefore, the time interval during which the motor-induced back current is reduced can be kept as short as possible and a waste of energy is avoided.

Also for the method in accordance with the invention it is preferred that controlling the bridge driver such that the motor-induced back current is reduced leads to a short circuiting of at least one winding of the DC motor. It is possible to short circuit all windings of the DC motor simultaneously by simultaneously coupling the connections of the respective windings to a common potential. Alternatively, it is possible to start with short circuiting only one winding and to short circuit one or more further windings only, if the power at the power supply output does not drop sufficiently. Resuming the normal deceleration procedure can be done the other way round.

In this context it is further preferred for the method in accordance with the invention that the short circuiting the at least one winding of the DC motor comprises setting the pulse width of the deceleration PWM signal to zero. In this case the at least one winding can, for example, be grounded in an easy way.

With other embodiments of the method in accordance with the invention controlling the bridge driver such that the motor-induced back current is reduced leads to a setting into a high impedance mode at least one winding of the DC motor. Also in this case it is possible—but not obligatory—to select the number of windings to be set into the high impedance mode according to the demand, as discussed above in connection with the short circuiting embodiment.

In this context the method can be further developed in that the setting into a high impedance mode the at least one winding of the DC motor comprises controlling the bridge driver such that it opens the connections to the at least one winding of the DC motor. Particularly if the bridge driver comprises a so called tri-state-terminal, this can be done very easy.

It is preferred for the method in accordance with the invention that the second voltage threshold is higher than VDD. For example, if VDD is equal to 12 V, then the first voltage threshold can be selected to be 15 V and the second voltage threshold can be selected to be 14.6 V. In general, energy waste can be best avoided, if the difference between the two voltage thresholds is small. However, the smaller the difference the more comparison operations are necessary.

In general, for recycling the kinetic energy stored in the rotating DC motor, the pulse width of the PWM deceleration signal has to be selected such that the DC motor current experiences a change of sign compared to an acceleration process of the DC motor.

In accordance with a second aspect of the invention the above object is solved by a controller of the type mentioned at the beginning, wherein the means for controlling the bridge driver such that the motor-induced back current is reduced are adapted to terminate controlling the bridge driver such that the motor-induced back current is reduced, if the voltage at the power supply output falls below a second voltage threshold which is lower than the first voltage threshold. Also with this solution not only the occurrence of a dangerous situation is monitored, but also the end thereof, and a waste of energy is avoided. In general, the characteristics and advantages discussed above in connection with the method in accordance with the invention are also achieved with the controller in accordance with the invention. Therefore, to avoid repetitions, reference is made to the above description. The same applies to the preferred embodiments of the controller in accordance with the invention discussed in the following.

With some embodiments of the controller in accordance with the invention the means for controlling the bridge driver such that the motor-induced back current is reduced are adapted to cause a short circuiting of at least one winding of the DC motor. In this case the means for controlling the bridge driver can, for example, be arranged to perform a hysteretic control and can, for example, comprise a comparator suitable to compare the voltage at the power supply output with the first and second voltage thresholds, and to indicate when one of the thresholds is reached. This comparator can control a multiplexer to which on one hand an acceleration/deceleration PWM signal is fed by a PWM signal generator and to which on the other hand a modified PWM signal is fed by a PWM signal modifier. If the motor-induced back current has to be reduced, the modified signal is forwarded to the bridge driver, and if it is not necessary to reduce the motor-induced back current, the regular PWM signal generated by the PWM signal generator is forwarded to the bridge driver.

In this context it is preferred for the controller in accordance with the invention, that the means for controlling the bridge driver such that the motor-induced back current is reduced are adapted to set the pulse width of the deceleration PWM signal to zero. To achieve this, the means for controlling the bridge driver can be as discussed in the preceding paragraph, wherein the PWM signal modifier can simply be a PWM signal nullifier.

Alternatively or additionally, it can be advantageous for the controller in accordance with the invention that the means for controlling the bridge driver such that the motor-induced back current is reduced are adapted to cause a setting into a high impedance mode at least one winding of the DC motor. In such a case the means for controlling the bridge driver can comprise a comparator as described above which, however, can be directly coupled to the bridge driver. Also the PWM signal generator can be directly coupled to the bridge driver without providing a multiplexer coupled intermediate these components.

In this connection it is further preferred for the controller in accordance with the invention that the means for controlling the bridge driver such that the motor-induced back current is reduced are adapted to cause an opening of the connections to the at least one winding of the DC motor. For example, the bridge driver can comprise a tri-state-terminal to which the comparator output can be coupled.

Also for the controller in accordance with the invention it is preferred that the second voltage threshold is higher than VDD. For example, the first and second voltage thresholds can differ by 2 to 5% of the VDD value.

As mentioned above, to perform a regenerative deceleration it is in general necessary that the means for applying a deceleration PWM signal to the bridge driver are adapted to select the pulse width of the PWM deceleration signal such that the DC motor current experiences a change of sign compared to an acceleration process of the DC motor.

All the components and means mentioned herein can be realized by analog and/or digital circuitry well known to the person skilled in the art. The use of microcontrollers, microprocessors and suitable software is also within the scope of the invention.

These and other aspects of the invention will be apparent from and elucidated with reference to the embodiments described hereinafter.

DESCRIPTION OF PREFERRED EMBODIMENTS

Figure 1A:
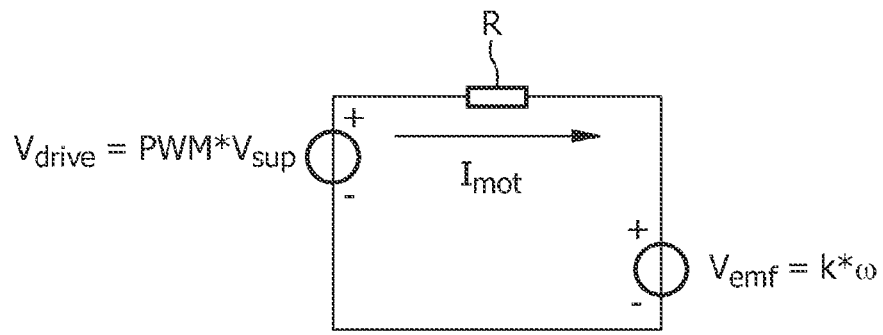
FIGS. 1a to 1c show a DC motor driver and DC motor model for three different modes of operation.
Figure 1B:
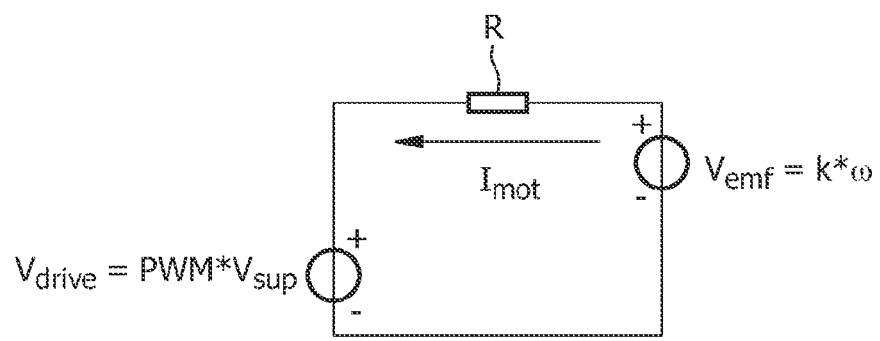
Figure 1C:
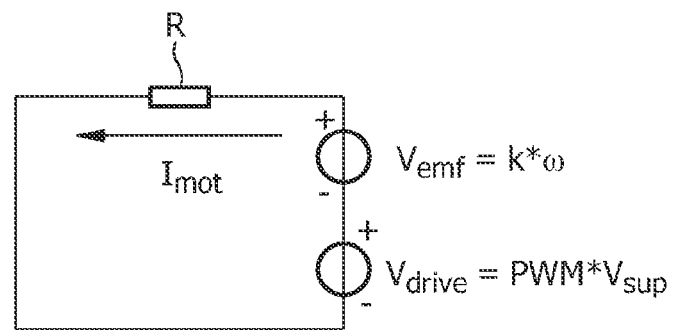

FIGS. 1a to 1c show a DC motor driver and DC motor model for three different modes of operation. It should be clear for the person skilled in the art that the motor model in accordance with FIGS. 1a to 1c is simplified. For example, if the motor is of the three-phase brushless type, the motor comprises three windings and the driving of these windings performed by a suitable bridge driver comprises several commutation phases for accelerating and/or decelerating the motor. As may be seen the model comprises two voltage sources $V_{drive}$ and $V_{emf}$ as well as a Resistor R. The drive voltage $V_{drive}$ is the output of a switching bridge with duty cycle PWM, i.e. $V_{drive}=PWM*V_{sup}$, wherein $V_{sup}$ is the supply voltage of the bridge driver. The back-EMF voltage of the motor is $V_{emf}=k*\omega$, wherein k is the motor constant and $\omega$ is the rotational frequency of the motor. The resistance R constitutes the total of switch resistance, the motor (winding) resistance and the wiring resistance of the connection from, for example, a motor driver IC to the motor.

FIG. 1a illustrates an acceleration process of the DC motor. In this case the drive voltage $V_{drive}$ is larger than the back-EMF voltage $V_{emf}$. Furthermore, the motor current $I_{mot}$ and the supply current $I_{sup}$ are positive, wherein $I_{sup}=PWM*I_{mot}$.

FIG. 1b illustrates a regenerative deceleration or braking process in accordance with the topic of the invention. In accordance with FIG. 1b a positive drive voltage $V_{drive}$ is used. $V_{drive}$ is smaller than the back-EMF voltage $V_{emf}$, and both the motor current $I_{mot}$ and the supply current $I_{sup}$ are negative, so that the supply current corresponds to the motor-induced back current.

FIG. 1c shows a deceleration or braking process using a negative drive voltage $V_{drive}$. De facto $V_{drive}$ in this case is superimposed on the back-EMF voltage $V_{emf}$, wherein the motor current $I_{mot}$ is negative (still braking) and the supply current $I_{sup}$ is positive. The case where the superimposed drive voltage $V_{drive}$ is zero is known as short-circuit braking.

The above situations can be covered by the following formulas:

$$I_{mot}=(V_{drive}-V_{emf})/R=(PWM*V_{sup}-V_{emf})/R, \text{ and}$$

$$I_{sup}=PWM*I_{mot}=PWM*(PWM*V_{sup}-V_{emf})/R$$

where PWM ranges from −100% to +100%.

Figure 2:
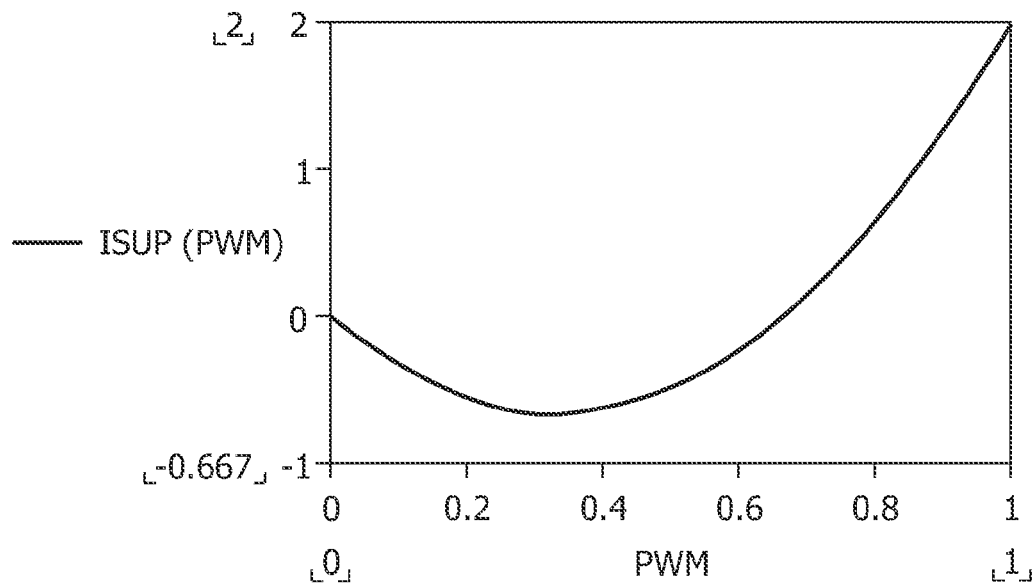
FIG. 2 shows an exemplary graph illustrating the dependency between the supply current and different PWM duty cycles.

It can be seen from FIG. 2 that the supply current $I_{sup}$ has a parabolic dependence on the duty cycle PWM, wherein negative values of $I_{sup}$ represent a motor-induced back current. FIG. 2 illustrates the following example: $V_{sup}$=12V, $V_{emf}$=8V, R=2 Ohm and positive PWM. In this case for duty cycles between 0 and $V_{emf}/V_{sup}$=⅔ there are negative supply currents and consequently there is regenerative braking. A maximum (negative) regenerated supply current exists at $V_{emf}/(2*V_{sup})$=⅓ with a supply current $I_{sup}$=−2*$V_{emf}/(4*V_{sup}*R)$. To make a regenerated braking control scheme by measuring the supply voltage $V_{sup}$ at the power supply output and controlling the PWM content, with a PWM-to-$I_{sup}$ transfer characteristic as above, two control directions are possible. When the supply voltage $V_{sup}$ exceeds the designed clamp value, i.e. the first voltage threshold because of the negative regenerative supply current $I_{sup}$, then this supply current $I_{sup}$ should be decreased, and can be decreased in two ways: control to smaller PWM in the direction of PWM=0% which coincides with short-circuit braking ($I_{mot}=V_{emf}/R$), or control to larger PWM in the direction of PWM=$V_{emf}/V_{sup}$ which coincides with a high-impedant braking ($I_{mot}$=0). In the following, two embodiments will be described with reference to FIG. 3 as well as 4 and 5, one embodiment for each of the above two ways/options.

Figure 3:
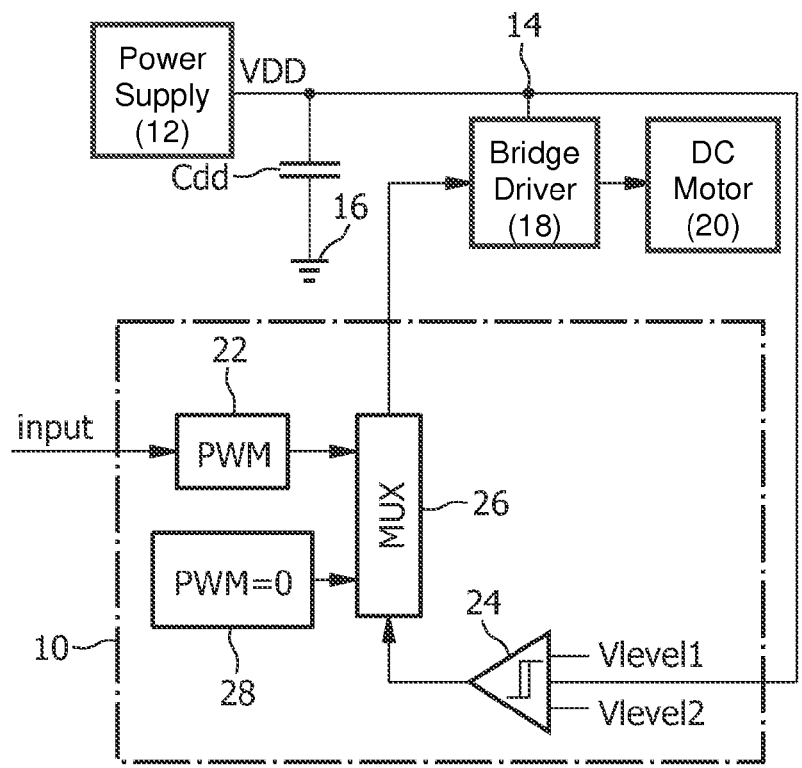
FIG. 3 shows a block diagram of a circuit using a first embodiment of the controller in accordance with the invention and being suitable for performing the method in accordance with the present invention.

FIG. 3 shows a block diagram of a circuit using a first embodiment of a controller 10 in accordance with the invention and being suitable for performing the method in accordance with the present invention. Besides the controller 10, which will be explained in detail later, the circuit comprises a power supply 12 having a power supply output 14. The power supply 12 is intended to provide at the supply voltage output a constant voltage VDD. Between the power supply output 14 and ground 16 there is provided a decoupling capacitor $C_{dd}$. Furthermore, a bridge driver 18 coupled to the power supply output 14 is provided for driving a DC motor 20. The bridge driver 18 is controlled by the controller 10 which comprises means 22 in form of a PWM signal generator 22 for applying a deceleration PWM signal to the bridge driver 18. It should be clear that the PWM signal generator 22 can also be adapted to provide acceleration PWM signals, but such acceleration PWM signals are of lower interest for the present invention. The output of the PWM signal generator 22 is coupled to a multiplexer 26 which also receives a PWM=0 signal from a PWM signal modifier or nullifier 28. The multiplexer 26 is controlled by a comparator 24 which is adapted to compare the voltage at the power supply output 14 with a first voltage threshold $V_{level1}$ and with a second voltage threshold $V_{level2}$.

With the embodiment shown in FIG. 3 the method in accordance with the invention can be carried out as follows: First, the PWM signal generator 22 applies a deceleration PWM signal to the bridge driver 18 via the multiplexer 26 which is controlled by the comparator 24 to forward the signal of the PWM signal generator 22. Thereby, a process for decelerating the DC motor is started such that, due to a suitable PWM signal, a regenerative deceleration occurs. If an over-voltage, i.e. a voltage higher than the first voltage threshold $V_{level1}$, occurs at the power supply output 14, this is detected by the comparator 24. In such a case the comparator 24 controls the multiplexer 26 to forward a PWM=0 signal to the bridge driver 18. Thereby, the windings of the DC motor 20 are short circuited, and this leads to a reduced motor-induced back current. Due to the reduced motor-induced back current the voltage at the power supply output 14 starts dropping, and as soon as this voltage falls below the second voltage threshold $V_{level2}$, this is detected by the comparator 24 and interpreted as the end of a dangerous condition. Therefore, the comparator 24 terminates the short circuiting of the motor windings by causing the multiplexer 26 to again forward the deceleration PWM signal generated by the PWM signal generator 22. It is clear that the above steps can be repeated a plurality of times during a deceleration process.

Figure 4:
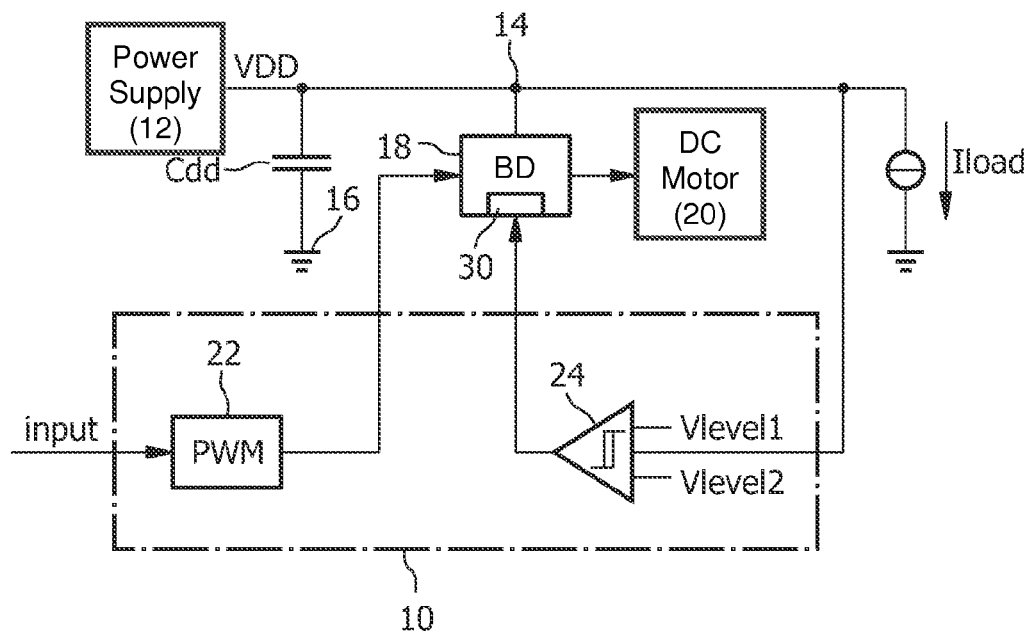
FIG. 4 shows a block diagram of a circuit using a second embodiment of the controller in accordance with the invention and being suitable for performing the method in accordance with the present invention.

FIG. 4 shows a block diagram of a circuit using a second embodiment of a controller 10 in accordance with the invention and being also suitable for performing the method in accordance with the present invention. Besides the controller 10, which will be explained in detail below, also the circuit of FIG. 4 comprises a power supply 12 having a power supply output 14. The power supply 12 is intended to provide at the supply voltage output a constant voltage VDD. As illustrated, a load current $I_{load}$ is drawn from further circuitry not shown in detail. Between the power supply output 14 and ground 16 there is provided a decoupling capacitor $C_{dd}$. Again, a bridge driver 18 coupled to the power supply output 14 is provided for driving a DC motor 20. The bridge driver 18 is controlled by the controller 10 which in this case comprises means 22 in form of a PWM signal generator 22 for applying a deceleration PWM signal to the bridge driver 18. Also for the embodiment of FIG. 4 it should be clear that the PWM signal generator 22 can also be adapted to provide acceleration PWM signals, but, as mentioned above, such acceleration PWM signals are of lower interest for the present invention. The output of the PWM signal generator 22 is coupled to the bridge driver 18. With this embodiment the bridge driver 18 comprises a so called tri-state-terminal 30. If this tri-state-terminal 30 is controlled accordingly, the bridge driver 18 sets all windings of the DC motor 20 into a high impedance mode by opening the respective connections of the windings. As may be seen, the tri-state-terminal 30 is coupled to the output of a comparator 24 which is adapted to compare the voltage at the power supply output 14 with a first voltage threshold $V_{level1}$ and with a second voltage threshold $V_{level2}$.

With the embodiment shown in FIG. 4 the method in accordance with the invention can be carried out as follows: First, the PWM signal generator 22 applies a deceleration PWM signal to the bridge driver 18. Thereby, a process for decelerating the DC motor is started such that, due to a suitable PWM signal, a regenerative deceleration occurs. If an over-voltage, i.e. a voltage higher than the first voltage threshold $V_{level1}$, occurs at the power supply output 14, this is detected by the comparator 24. In such a case the comparator 24 applies a signal to the tri-state-terminal 30 of the bridge driver 18 that causes the bridge driver 18 to set the windings of the DC motor 20 into a high impedance mode, as explained above. Thereby the motor-induced back current is reduced. Due to the reduced motor-induced back current the voltage at the power supply output 14 starts dropping, and as soon as this voltage falls below the second voltage threshold $V_{level2}$, this is detected by the comparator 24 and interpreted as the end of a dangerous condition. Therefore, the comparator 24 terminates setting the DC motor windings into the high impedance mode, and the deceleration PWM signal generated by the PWM signal generator 22 is operative again. Also for this embodiment it should be clear that the above steps can be repeated a plurality of times during a deceleration process.

Figure 5:
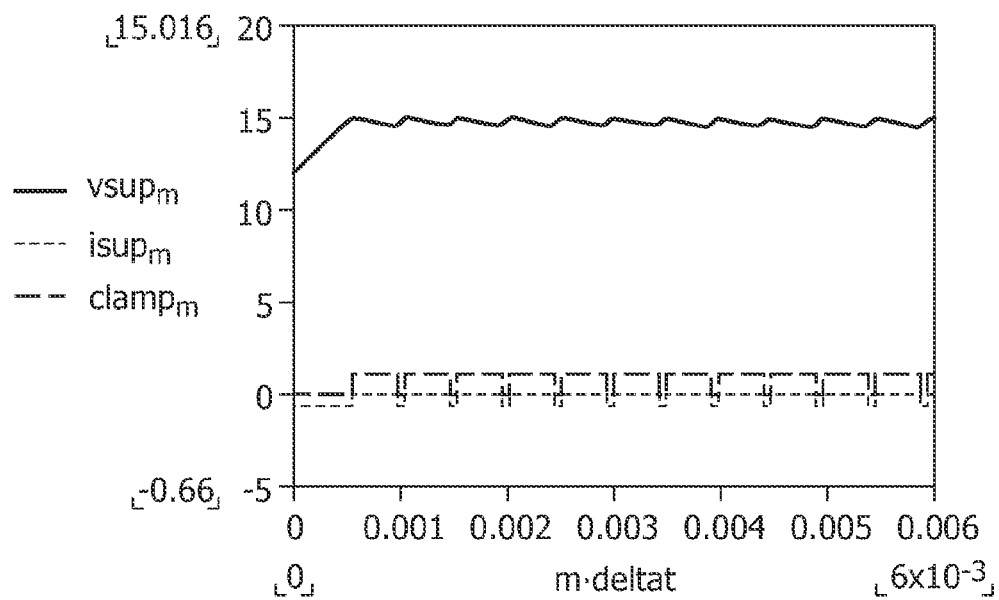
FIG. 5 shows a graph illustrating an example for supply voltage, motor-induced back current and motor clamp profiles obtained by applying the method of the present invention.

FIG. 5 shows a graph illustrating a possible operation of the circuit shown in FIG. 4, wherein $V_{DD}$=12 V, $C_{dd}$=100 µF, $V_{emf}$=8 V, R=2 Ohm (R is not explicitly shown, but is as discussed in connection with FIGS. 1a to 1c), PWM=30%, $I_{load}$=100 mA, $V_{level1}$=15 V, and $V_{level2}$=14,6 V. When there is load current $I_{load}$ drawn from the supply that is smaller than the regenerative brake current (otherwise the supply voltage at the power supply output 14 would not rise), the result is a rippling supply voltage $V_{sup}$ between $V_{level1}$ and $V_{level2}$. As may be seen, the negative supply current $I_{sup}$, i.e. the motor-induced back current, jumps to zero, when the first voltage threshold $V_{level1}$ is exceeded at the power supply output 14, i.e. if the clamping performed by the comparator 24 is active.

Figure 6:
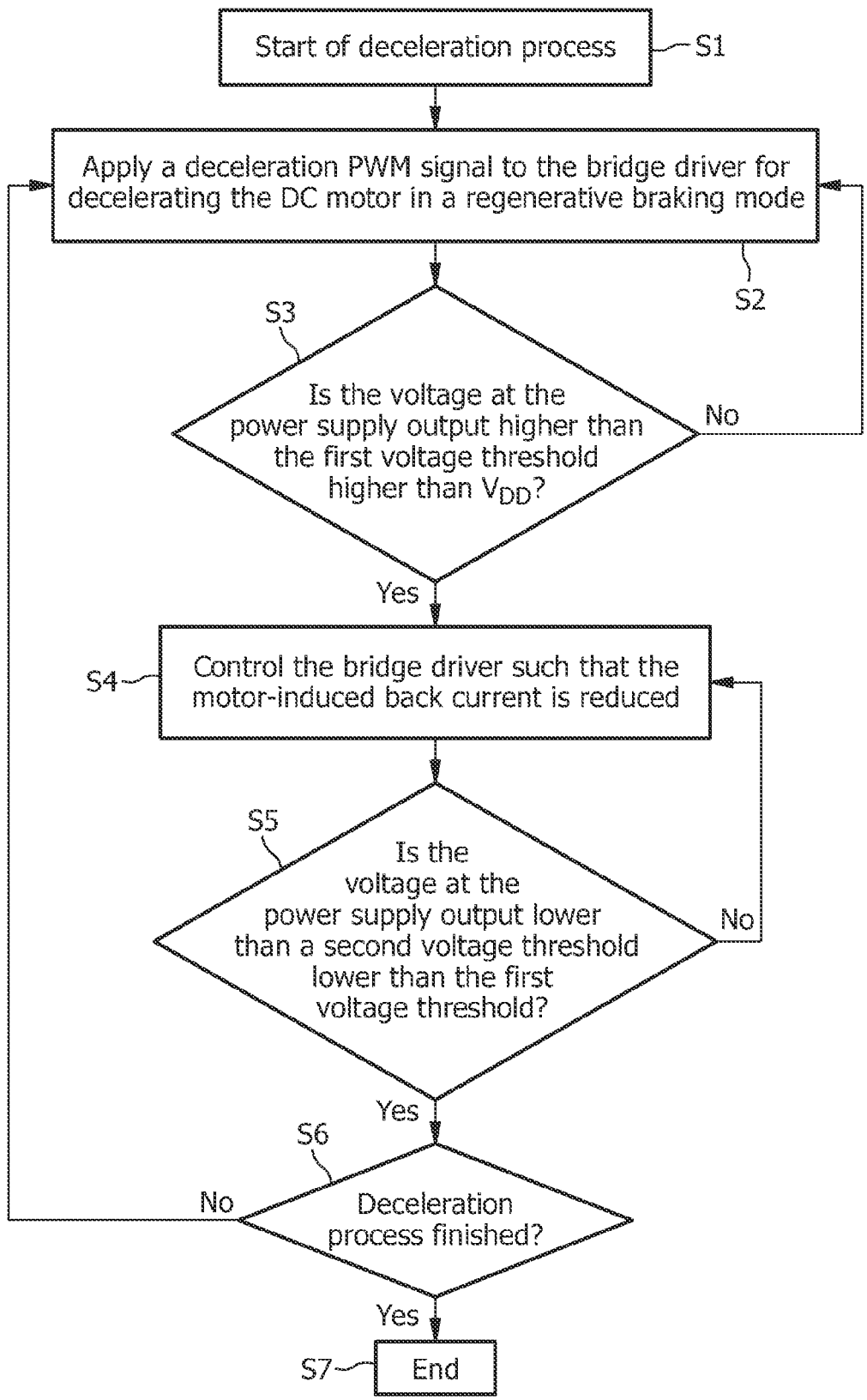
FIG. 6 shows a flowchart illustrating a more general embodiment of the method in accordance with the invention.

FIG. 6 shows a flowchart illustrating a more general embodiment of the method in accordance with the invention. In step S1 a regenerative deceleration process is started. For this reason in step S2 a suitable deceleration PWM signal is applied to the bridge driver for decelerating the DC motor in a regenerative braking mode. In step S3 it is checked whether the voltage at the power supply output is higher than the first voltage threshold higher than VDD. If this is not the case, the method goes back to step S2, otherwise it continues with step S4 where the bridge driver is controlled such that the motor-induced back current is reduced. Then, it is checked in step S5 whether the voltage at the power supply output is lower than a second voltage threshold lower than the first voltage threshold. If this is not the case, the method returns to step S4, otherwise it continues to step S6 where it is checked whether the deceleration process is finished. If this is the case, the method ends in step S7, otherwise it goes back to step S2 where the suitable deceleration PWM signal is again applied to the bridge driver for decelerating the DC motor in a regenerative braking mode.

Finally, it is to be noted that equivalents and modifications not described above may also be employed without departing from the scope of the invention, which is defined in the accompanying claims.

The invention claimed is

1. A method for controlling a deceleration process of a DC motor, wherein the DC motor is driven by a bridge driver coupled to a power supply intended to provide a supply voltage VDD at a power supply output, the method comprising:
applying a deceleration Pulse Width Modulation (PWM) signal to the bridge driver for decelerating the DC motor;
controlling the bridge driver such that a motor-induced back current is reduced if the voltage at the power supply output exceeds a first voltage threshold which is higher than VDD; and
in response to the voltage at the power supply output falling below a second voltage threshold which is lower than the first voltage threshold terminating controlling the bridge driver to reduce the motor-induced back current.

2. The method according to claim 1, wherein controlling the bridge driver such that the motor-induced back current is reduced leads to a short circuiting of at least one winding of the DC motor.

3. The method according to claim 2, wherein the short circuiting the at least one winding of the DC motor comprises setting the pulse width of the deceleration PWM signal to zero.

4. The method according to claim 1, wherein controlling the bridge driver such that the motor-induced back current is reduced leads to a setting into a high impedance mode at least one winding of the DC motor.

5. The method according to claim 4, where the setting into a high impedance mode the at least one winding of the DC motor comprises controlling the bridge driver such that it opens the connections to the at least one winding of the DC motor.

6. The method according to claim 1, wherein the second voltage threshold is higher than VDD.

7. The method according to claim 1, wherein the pulse width of the PWM deceleration signal is selected such that the DC motor current experiences a change of sign compared to an acceleration process of the DC motor.

8. A controller for a DC motor which is driven by a bridge driver coupled to a power supply intended to provide a supply voltage VDD at a power supply output, the controller comprising:
means for applying a deceleration PWM signal to the bridge driver for decelerating the DC motor;
means for controlling the bridge driver such that the motor-induced back current is reduced if the voltage at the power supply output exceeds a first voltage threshold which is higher than VDD and for terminating control of the bridge driver such that the motor-induced back current is reduced if the voltage at the power supply output falls below a second voltage threshold which is lower than the first voltage threshold.

9. The controller according to claim 8, wherein the means for controlling the bridge driver are adapted to cause a short circuiting of at least one winding of the DC motor.

10. The controller according to claim 9, wherein the means for controlling the bridge driver are adapted to set the pulse width of the deceleration PWM signal to zero.

11. The controller according to claim 8, wherein the means for controlling the bridge driver are adapted to cause a setting into a high impedance mode at least one winding of the DC motor.

12. The controller according to claim 11, wherein the means for controlling the bridge driver are adapted to cause an opening of the connections to the at least one winding of the DC motor.

13. The controller according to claim 8, wherein the second voltage threshold is higher than VDD.

14. The controller according to claim 8, wherein the means for applying a deceleration PWM signal to the bridge driver are adapted to select the pulse width of the PWM deceleration signal such that the DC motor current experiences a change of sign compared to an acceleration process of the DC motor.

15. A controller for a DC motor which is driven by a bridge driver coupled to a power supply intended to provide a supply voltage VDD at a power supply output, the controller comprising:
a PWM signal generator for applying a deceleration PWM signal to the bridge driver for decelerating the DC motor; and
a circuit configured and arranged to control the bridge driver such that the motor-induced back current is reduced if the voltage at the power supply output exceeds a first voltage threshold which is higher than VDD and to terminate control of the bridge driver such that the motor-induced back current is reduced if the voltage at the power supply output falls below a second voltage threshold which is lower than the first voltage threshold.

16. The controller according to claim 15, wherein the circuit controlling the bridge driver is adapted to cause a short circuiting of at least one winding of the DC motor.

17. The controller according to claim 16, wherein the circuit for controlling the bridge driver is adapted to set the pulse width of the deceleration PWM signal to zero.

18. The controller according to claim 15, wherein the circuit for controlling the bridge driver is adapted to cause a setting into a high impedance mode at least one winding of the DC motor.

19. The controller according to claim 15, wherein the circuit for controlling the bridge driver is adapted to cause an opening of the connections to the at least one winding of the DC motor.

20. The controller according to claim 15, wherein the second voltage threshold is higher than VDD.

21. The controller according to claim 15, wherein the PWM signal generator for applying a deceleration PWM signal to the bridge driver is adapted to select the pulse width of the PWM deceleration signal such that the DC motor current experiences a change of sign compared to an acceleration process of the DC motor.

* * * * *